(12) United States Patent
Sadiq

(10) Patent No.: US 6,519,652 B1
(45) Date of Patent: Feb. 11, 2003

(54) METHOD AND SYSTEM FOR ACTIVATION AND DEACTIVATION OF DISTRIBUTED OBJECTS IN A DISTRIBUTED OBJECTS SYSTEM

(75) Inventor: Waqar Sadiq, Rochester Hills, MI (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/016,086

(22) Filed: Jan. 30, 1998

Related U.S. Application Data

(60) Provisional application No. 60/065,400, filed on Nov. 13, 1997.

(51) Int. Cl.$^7$ .............. G06F 9/00; G06F 9/46
(52) U.S. Cl. ................................ 709/316; 709/104
(58) Field of Search ................. 709/315, 104, 709/105, 316, 206, 203; 707/206, 103 R; 711/160, 159, 154

(56) References Cited

U.S. PATENT DOCUMENTS 5,475,817 A * 12/1995 Waldo et al. ............... 395/650
5,870,753 A * 2/1999 Chang et al. ............... 707/103
6,161,147 A * 12/2000 Snyder et al. ............... 709/310

OTHER PUBLICATIONS

S. Prata, C++ Primer Plus, 2nd ed., 1995, pp. 125–127, 140–143.*

* cited by examiner

Primary Examiner—Sue Lao
(74) Attorney, Agent, or Firm—Baker Botts, LLP

(57) ABSTRACT

One aspect of the invention is a method for activation and deactivation of distributed objects. A first number of a plurality of distributed objects are stored in the memory of a first computer. A request is received to execute a method on a first one of the plurality of distributed objects wherein the first distributed object is to be stored in the memory of the first computer but is not currently stored in the memory of the first computer and wherein the request comprises the object identity of the first distributed object. One of the first number of distributed objects resident in the memory of the first computer is deactivated in response to the request if a resource limit has been reached. A first distributed object is activated wherein the object identity of the first distributed object is used to determine the object class and location of the first distributed object. The method is executed in response to the request.

19 Claims, 2 Drawing Sheets

_US 6,519,652 B1_

METHOD AND SYSTEM FOR ACTIVATION AND DEACTIVATION OF DISTRIBUTED OBJECTS IN A DISTRIBUTED OBJECTS SYSTEM

RELATED APPLICATIONS

This application claims the benefit of U.S. provisional application serial No. 60/065,400, which was filed on Nov. 13, 1997.

TECHNICAL FIELD OF THE INVENTION

This invention relates generally to object-oriented programming and more particularly to a method and system for activation and deactivation of distributed objects in a distributed object system.

BACKGROUND OF THE INVENTION

Software developers have begun considering the implementation of large distributed object systems. In such systems, distributed objects may be used concurrently by multiple processes. Because these objects are stored in memory, concurrent usage may cause memory management problems. If all distributed objects in a system had to be stored in memory simultaneously, the system would either be very expensive, very slow, or both if the system was a large system. In addition, such a system would waste memory resources because it is unlikely that all objects in the distributed system would be used at the same time.

Accordingly, developers of distributed object systems may find it desirable to load distributed objects into memory when needed for use, but otherwise maintain the object in a database. Unfortunately, existing methods to accomplish the loading of objects into memory when needed often impose significant burdens on the application developer.

SUMMARY OF THE INVENTION

The invention comprises a method and system for activation and deactivation of distributed objects. One aspect of the invention is a method for activation and deactivation of distributed objects wherein a first number of a plurality of distributed objects are stored in the memory of a first computer. A request is received to execute a method on a first one of the plurality of distributed objects wherein the first distributed object is to be stored in the memory of the first computer but is not currently stored in the memory. The request comprises the object identity of the first distributed object. One of the first number of distributed objects resident in the memory of the first computer is deactivated in response to the request if a resource limit has been reached. The first distributed object is activated wherein the object-identity of the first distributed object is used to determine the object class and location of the first distributed object. The method is then executed in response to the request.

The invention has several important technical advantages. Because the invention utilizes the object identity to determine the object class and location of a distributed object to be activated, activation can occur automatically using a distributed object system framework. The framework facilitates simplified application development as the application developer does not need to concern himself with details of object activation and deactivation. The invention allows several different methods to be used to determine which object should be activated or deactivated. In addition, an application developer may adjust the resource limit used to determine when the memory of a computer is full based upon the developer's experience with a particular system. The invention may be used with a persistence service that maintains the state of an object in a database consistently with the state of the object in memory. Thus, deactivation of a distributed object may be accomplished simply and quickly by removing the distributed object from memory.

By activating and deactivating distributed objects as needed, the invention makes efficient use of system resources such as memory. The invention may use protocols similar to cache control protocols to automatically activate and deactivate distributed objects. By using such protocols, the invention may take advantage of the increased probability that an object that has been recently accessed will again be accessed in the near future. By taking advantage of such increased probability, the invention reduces the amount of overhead used for activation and deactivation of distributed objects.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
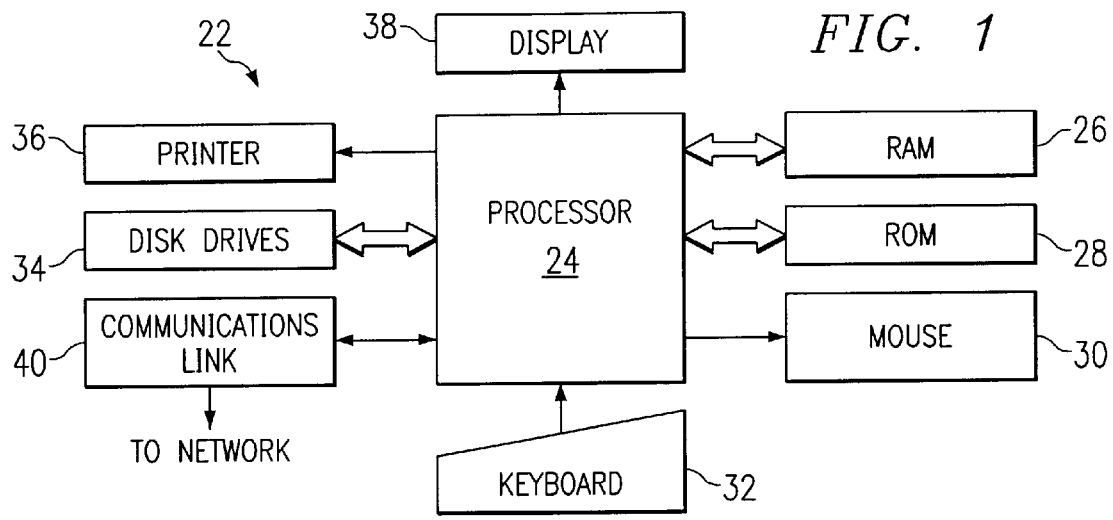
FIG. 1 illustrates an exemplary general purpose computer that may be used to implement the present invention.
Figure 2:
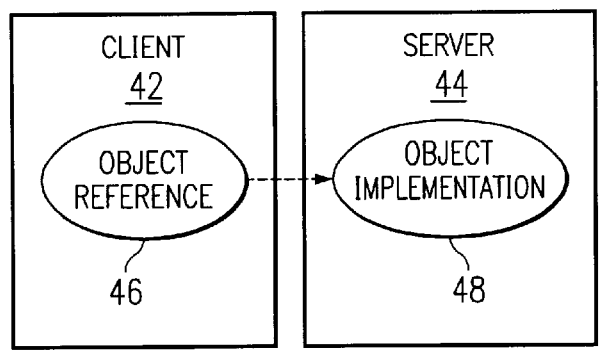
FIG. 2 illustrates an exemplary distributed object system utilizing the invention.
Figure 3:
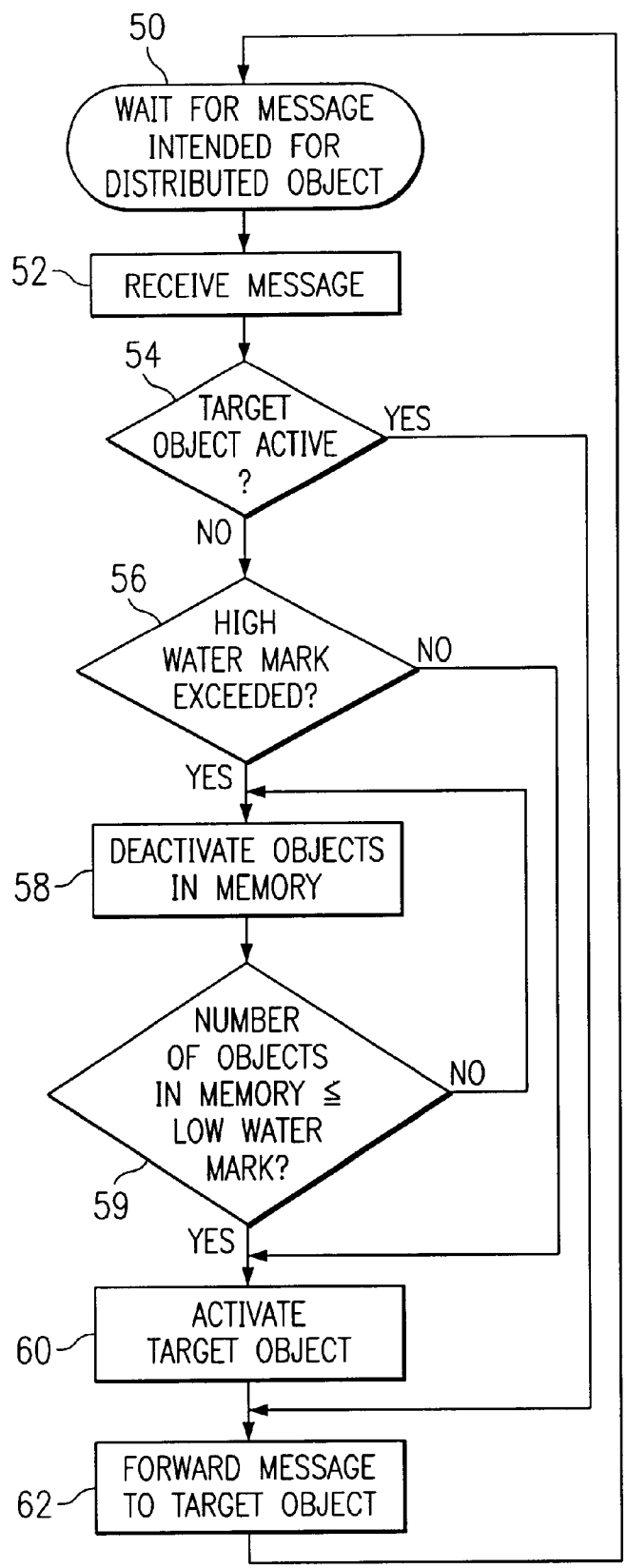
FIG. 3 illustrates a flow chart describing the operation of one embodiment of the invention.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed applications and/or distributed system services in accordance with the invention. General purpose computer 22 may be adapted to execute any of the well-known OS 2, UNIX, MAC-OS, and WINDOWS operating systems or other operating systems. General purpose computer 22 comprises processor 24, random access memory, (RAM) 26, read-only memory (ROM) 28, mouse 30, keyboard 32, and input/output devices such as disk drives 34, printer 36, display 38, and communications link 40. The present invention includes programs that may be stored in RAM 26, ROM 28, or disk drives 34 and may be executed by processor 24. Communications link 40 connects to a computer network but could be connected to a telephone line, an antenna, a gateway, or any other type of communications link. Disk drives 34 may include a variety of types of storage media such as, for example, floppy disk drives, hard disk drives, CD ROM drives, or magnetic tape drives. Although this embodiment employs a plurality of disk drives 34, a single disk drive 34 could be used without departing from the scope of the invention. FIG. 1 only provides one example of a computer that may be used with the invention. The invention could be used on computers other than general purpose computers, as well as on general purpose computers without conventional operating systems.

FIG. 2 illustrates an exemplary embodiment of a portion of a distributed object system constructed in accordance with the invention. In this embodiment, a client process 42 is running on a computer such as, for example, a computer like the one illustrated in FIG. 1. Server process 44 is running on the same or a different computer. The computers running client process 42 and server process 44 may be connected by a computer network or through some other connection method.

Client process 42 includes an object reference 46 that client process 42 uses to access the methods of object implementation 48. Object implementation 48 is controlled by server process 44 and comprises a distributed object.

Object reference 46 may also be referred to as a proxy for object implementation 48. In this embodiment, a local object reference 46 is used by a process such as client process 42 to access a remotely located distributed object such as object implementation 48. Whenever client process 42 seeks to access object implementation 48, client process 42 may obtain the information necessary to create an instance of object reference 46 from a name service (not explicitly shown). The name service has access to data that, for each object name, may be used to instantiate an object reference. For example, such data could comprise a string that is stored by the name service and may be used to create an instance of object reference 46. Object reference 46 includes an object identity. In this embodiment, the object identity includes information indicating the object class to which the object implementation 48 belongs and the location of object implementation 48. More specifically, the object identity information includes the persistent context of the object, the type of the object, and the key for the object. The persistent context portion of the identity may include such information as the database name in which object implementation 48 is stored, connection information for that database, the type of database, log-in information for that database, and the password for that database. The type portion of the object identity includes the interface name for the object. The key portion of the object identity is a unique identifier of a particular distributed object.

Object reference 46 communicates with object implementation 48 through an object request broker. The object request broker may be implemented in a number of different ways. In this embodiment, portions of the object request broker are contained in client process 42 and server process 44. Alternatively, the object request broker may be implemented as one or more stand-alone processes or one or more stand-alone processes in cooperation with code in client process 42 and/or server process 44.

When client process 42 seeks to execute a method of object implementation 48, it does so through object reference 46. Object reference 46 passes a request to access object implementation 48 through an object request broker. Although other pieces of information may be included with this request, the invention advantageously passes the identity for object implementation 48 from which the class of object implementation 48 and its location may be determined along with the identification of the method of object implementation 48 to be accessed. The object identity information passed also includes all information required to retrieve object implementation 48 from a database and activate it by loading it into the memory of the computer that is running server process 44.

When a request to execute a method on object implementation 48 is received by the object request broker, it determines whether object implementation 48 currently resides in memory or not. If so, then the request is forwarded to object implementation 48, the method executed, and the results returned using the object request broker to object reference 46. If object implementation 48 is not in memory, then it is first loaded into memory before the method is executed. If a resource limit has been reached, then one or more objects may need to be deactivated before object implementation 48 can be loaded into memory. The details of the decision as to which distributed objects to deactivate before activating object implementation 48 will be discussed in more detail in connection with FIG. 3 below. Here, the process for loading object implementation 48 into memory will be briefly described.

To load object implementation 48 into memory (and thus cause object implementation 48 to be activated) the object request broker maintains a list of those distributed objects currently resident in the memory of the computer in which object implementation 48 is to be loaded. Thus, the object request broker first determines whether object implementation 48 is stored in memory and, in the case where it is not loaded, takes steps to load it. Although numerous methods can be used to load object implementation 48 into memory, this embodiment employs a life cycle object manager to activate object implementation 48 by loading it into memory.

One embodiment of a life cycle object manager, comprises an object which loads object implementation 48 into memory and returns successfully if the loading was successful. After a successful return is indicated from the life cycle object manager, then the object request broker may pass the request to execute a method to object implementation 48. The life cycle object manager may contain one or more routines that may be used to load a particular type of distributed object into memory. In this embodiment, the life cycle object manager invokes each routine one by one until it receives a return from one of the routines indicating that a distributed object was successfully loaded into memory. The routines to load a particular distributed object into memory may be tailored to the specific object class. The life cycle object manager uses the object identity information that was passed by object reference 46 through the object request broker to load object implementation 48 into memory.

FIG. 3 illustrates a flow chart describing the operation of an exemplary embodiment of the invention. This flow chart describes the operation of the object request broker and lifecycle object manager but the operations that are performed could be performed by any software. In step 50, the object request broker waits for a message to be received that is intended for a distributed object. In step 52, a message is received. Then, in step 54, it is determined whether the object to which the message was directed (the target object) is active or not. Again, the object request broker receives, as part of a request to execute a method, object identity information that identifies the distributed object to which the request is directed. The identity allows a lifecycle object manager to determine the object class of the target object as well as the location of the target object. Moreover, the identity information may contain all of the information required for the lifecycle object manager to cause the activation of the distributed object by loading that object into memory. The object request broker maintains a list of objects that are active to perform the determination in step 54.

The distributed objects assigned to a particular computer may be a relatively static list or may be a dynamic list. In a static situation, an object is created and assigned to a particular process on a particular computer and from that point forward will always be activated in the memory of that process on that computer as its primary computer. A workload service may be used to select the best computer for this job at the time the object is created. Alternatively, in a dynamic situation, the workload of each individual process on each computer may be monitored on an ongoing basis and the determination of where a particular distributed object should be activated may be made at the time a request is received to activate the object. Alternatively, a computer could be chosen at random. Either the static or dynamic method may be used with the present invention.

If, in step 54, it is determined that the target object is active, then the message is forwarded to the target object in step 62 for execution of the method and, after receiving a return from the target object, the object request broker returns to step 50 to wait for a subsequent message. If it is determined in step 54 that the target object is not active, then it is determined in step 56 whether a particular resource limit has been reached.

The determination of whether a resource limit has been reached may be done in many different ways using many different algorithms without departing from the scope of the invention. The determination that needs to be made is whether an object can be activated immediately or whether one or more distributed objects need to be deactivated before activating the distributed object to which a request is directed. If sufficient memory resources are available, an inactive object could be activated prior to deactivating other objects.

One method of making this determination is to define the resource limit as an integer number of distributed objects. When this integer number of distributed objects is already present in memory, then one or more distributed objects are deactivated prior to activating the target object. Another method is to maintain some type of estimated size of an object and compare the aggregate estimated size of all distributed objects currently residing in memory to the size of the block of memory allocated for holding distributed objects. Then, if the addition of the object to be activated would exceed the capacity of the memory, one or more objects may be deactivated to make space for the target object.

One embodiment employs a high water mark and low water mark protocol using an integer number of objects. According to this protocol, an integer number of objects is established as a high water mark and a different integer number is established as a low water mark. In this embodiment, the default high water mark is 100 distributed objects while the default low water mark is 50 distributed objects. These water marks may be established by the application developer and may be changed over time based upon experience with a distributed system. In addition, different water marks could be set for different machines in a distributed object system based upon memory capacity and processing speed.

In this embodiment, the lifecycle object manager continues to load distributed objects into memory until the high water mark is reached and/or exceeded. If the high water mark has not been exceeded, then the target object is activated in step 60. The lifecycle object manager activates the target object in step 60 using the object identity to determine the object class and the location of the object. The object is then retrieved from the database and loaded into memory. Thus, an object can be activated based upon the request received from an object reference such as object reference 46 without additional complications.

If the high water mark was exceeded in step 56, then one or more objects in memory are deactivated in step 58. In this embodiment, objects are deactivated until the number of objects remaining in the memory is equal to or less than the low water mark as shown in step 59. The deactivated objects may be chosen by a number of methods without departing from the scope of the invention. In this embodiment, the objects chosen for deactivation are preferably chosen based upon the usage of the distributed objects. Because objects that have been recently used have a high probability of being used again in the near future, the objects chosen for deactivation may be those that have been least recently accessed. Again, alternatives could be used. For example, one could choose to deactivate objects based upon their age—that is, based upon the amount of time the object has been in memory. In one embodiment, after the high water mark is reached, all objects older than a specific age are deactivated until the low water mark has been reached. Again, the age parameter may be reconfigured by the developer of a distributed object system but may be, for example, one hour. Other methods of choosing objects for deactivation may be used without departing from the scope of the invention.

In this embodiment, the persistence of distributed objects is maintained by updating the representation of an object in a database whenever a change is made to the object in memory of one of the computers of the distributed object system. Because the persistence of objects is maintained, the deactivation of objects in step 58 amounts to simply removing the objects to be deactivated from memory. No additional steps are required for deactivation.

In order to keep track of which objects to deactivate, the lifecycle object manager may also record a time stamp each time an object is accessed. This time stamp may be retained by the lifecycle object manager and used in step 58 to determine which objects in memory to deactivate.

Although the present invention has been described in detail, it should be understood that various changes, substitutions, and alterations can be made hereto without departing from the spirit and scope of the invention as defined by the appended claims.

What is claimed is:

1. A method for activation and deactivation of distributed objects, comprising:

storing a first number of a plurality of distributed objects in the memory of a first computer;

receiving a request to execute a method on a first one of the plurality of distributed objects, wherein the first distributed object is to be stored in the memory of the first computer but is not currently stored in the memory of the first computer, and wherein the request comprises the object identity of the first distributed object;

deactivating one of the first number of distributed objects resident in the memory of the first computer in response to the request if a resource limit has been reached;

activating the first distributed object wherein the object identity of the first distributed object is used to determine the object class and location of the first distributed object;

executing the method in response to the request;

deactivating x of the first number of distributed objects by maintaining a record of the time at which each distributed object in memory was last accessed; and maintaining a high water mark and low water mark for the number of objects in memory wherein the high water mark corresponds to the resource limit and wherein x comprises the difference between the high water mark and the low water mark, and wherein the x distributed objects deactivated are the x distributed objects that were last accessed least recently.

2. The method of claim 1, wherein the resource limit comprises an integer number of distributed objects.

3. The method of claim 1, wherein the resource limit comprises a specific number of memory bytes assigned to distributed objects.

4. The method of claim 1, wherein the deactivating of one of the distributed objects occurs by deleting that distributed object from the memory of the first computer.

5. The method of claim 1, wherein the first distributed object is assigned to be activated in the memory of the first computer at creation time.

6. The method of claim 1, wherein the first distributed object is assigned to be activated in the memory of the first computer at activation time.

7. The method of claim 1, wherein the request is generated by a second computer coupled to the first computer.

8. The method of claim 1, wherein the distributed object that is deactivated is chosen by maintaining a record of the time at which each distributed object in memory was last accessed and deactivating the distributed object that was last accessed least recently.

9. The method of claim 1, further comprising:
maintaining a list of distributed objects resident in the memory of the first computer using an object request broker;
determining whether the first one of the plurality of distributed objects is in the memory of the first computer by referencing the list; and
updating the list when the first one of the plurality of distributed objects is activated.

10. The method of claim 1, wherein the first one of the plurality of distributed objects is activated by retrieving data from a database.

11. The method of claim 9, wherein the first one of the plurality of distributed objects is activated by using the object identity to identify a database name and key to facilitate retrieval of object data from a database.

12. A distributed object system for use with a plurality of computers, comprising:
a first number of a plurality of distributed objects stored in the memory of a first computer;
an object request broker running on the first computer and operable to receive a request to execute a method on a first one of the plurality of distributed objects, wherein the first distributed object is to be stored in the memory of the first computer but is not currently stored in the memory of the first computer, and wherein the request comprises the object identity of the first distributed object; and
a lifecycle object manager operable to
deactivate one of the distributed objects resident in the memory of the first computer in response to the request if a resource limit has been reached,
activate the first one of the plurality of distributed objects, wherein the object identity of the first distributed object is used to determine the object class and location of the first distributed object,
deactivate x of the first number of distributed objects by maintaining a record of the time at which each distributed object in memory was last accessed,
maintain a high water mark and low water mark for the number of objects in memory wherein the high water mark corresponds to the resource limit and wherein x comprises the difference between the high water mark and the low water mark, and wherein the x distributed objects deactivated are the x distributed objects that were last accessed least recently.

13. The distributed object system of claim 2, wherein the object request broker is further operable to:

maintain a list of distributed objects resident in the memory of the first computer;
determine whether the first one of the plurality of distributed objects is in the memory of the first computer by referencing the list; and
update the list when the first one of the plurality of distributed objects is activated.

14. The distributed object system of claim 12, wherein the first one of the plurality of distributed objects is activated by obtaining its identity from the object request broker, using its identity to identify a database name and key to facilitate retrieval of object data from a database.

15. The distributed object system of claim 13, wherein the first one of the plurality of distributed objects is activated by obtaining its identity from the object request broker, using its identity to identify a database name and key to facilitate retrieval of object data from a database.

16. The distributed object system of claim 15, wherein the distributed object that is deactivated is chosen by maintaining a record of the time at which each distributed object in memory was last accessed and deactivating the distributed object that was last accessed least recently.

17. A distributed object system, comprising:
a computer readable storage medium;
an object request broker stored on the computer readable storage medium and operable to
receive a request to execute a method on a first one of a plurality of distributed objects, wherein the first distributed object is to be stored in the memory of a first computer but is not currently stored in the memory of the first computer, and wherein the request comprises the object identity of the first distributed object; and
a lifecycle object manager stored on the computer readable storage medium and operable to
deactivate one of the plurality of distributed objects resident in the memory of the first computer in response to the request if a resource limit has been reached,
activate the first one of the plurality of distributed objects, wherein the object identity of the first distributed object is used to determine the object class and location of the first distributed object,
deactivate x of the first number of distributed objects by maintaining a record of the time at which each distributed object in memory was last accessed,
maintain a high water mark and low water mark for the number of objects in memory wherein the high water mark corresponds to the resource limit and wherein x comprises the difference between the high water mark and the low water mark, and wherein the x distributed objects deactivated are the x distributed objects that were last accessed least recently.

18. The distributed object system of claim 17, wherein the object request broker is further operable to:
maintain a list of distributed objects resident in the memory of the first computer;
determine whether the first one of the plurality of distributed objects is in the memory of the first computer by referencing the list; and
update the list when the first one of the plurality of distributed objects is activated.

19. The distributed object system of claim 18, wherein the first one of the plurality of distributed objects is activated by obtaining its identity from the object request broker, using its identity to identify a database name and key to facilitate retrieval of object data from a database.

* * * * *